(12) United States Patent
Reilly

(10) Patent No.: US 6,215,807 B1
(45) Date of Patent: Apr. 10, 2001

(54) COHERENT MULTIPLE BEAM LASER SYSTEM

(75) Inventor: James P. Reilly, East Sandwich, MA (US)

(73) Assignee: Northeast Science & Technology, Sandwich, MA (US)

( * ) Notice: Subject to any disclaimer, the term of this patent is extended or adjusted under 35 U.S.C. 154(b) by 0 days.

(21) Appl. No.: 09/027,591

(22) Filed: Feb. 24, 1998

(51) Int. Cl.$^7$ ............................... H01S 3/10; H01S 3/22; H01S 3/097; H01S 3/08
(52) U.S. Cl. ............................ 372/57; 372/23; 372/55; 372/57; 372/87; 372/95
(58) Field of Search ........................... 372/55, 95, 57, 372/23

(56) References Cited

U.S. PATENT DOCUMENTS

| | | | | |
|---|---|---|---|---|
| 5,029,173 | * | 7/1991 | Seguin | 372/23 |
| 5,386,431 | * | 1/1995 | Tulip | 372/68 |

* cited by examiner

Primary Examiner—Frank G. Font
Assistant Examiner—Armando Rodriguez
(74) Attorney, Agent, or Firm—Iandiorio & Teska

(57) ABSTRACT

A coherent multiple beam laser system including a plurality of slab lasers and a feedback device responsive to the output of at least one of the slab lasers, for feeding back a portion of the slab laser output to the remaining slab lasers for synchronizing the phase of the outputs of all the slab lasers.

36 Claims, 14 Drawing Sheets

COHERENT MULTIPLE BEAM LASER SYSTEM

GOVERNMENT RIGHTS

This invention was made with U.S. Government support under Contract No. F29601-98-C-0013 awarded by the U.S. Air Force. The Government may have certain rights in the subject invention.

FIELD OF INVENTION

This invention relates to a multiple beam laser system which is made coherent by combining and optically phase-locking multiple individual lasing medium outputs into a single coherent laser beam.

BACKGROUND OF INVENTION

Today's industrial manufacturing lines are far more complex and automated than they were only a few years ago. Quite often, hi-tech manufacturing techniques have replaced the more traditional methods previously used. An example of this is the growing use of lasers during component prototyping and high volume manufacturing. Components that were traditionally cut with dies or flame cutters are often made with production lasers.

When these production lasers are used to cut materials of considerable strength or thickness, such as plate steel, the energy level of the laser must be raised to provide the required cutting strength. Unfortunately, as the power level of these lasers increases, so does their size and their cooling requirements. High average power continuous wave (CW) or pulsed gas lasers (such as $CO_2$) of the type used on product production or processing lines have traditionally been cooled by large forced convection cooling systems. As a result, these laser systems are very large in design and incorporate complex gas-transportation and heat-exchanging systems. In addition to being exceptionally large, these laser systems are very complex in design and incorporate many moving parts, which make these systems very costly to design and install. Besides the one-time cost associated with purchasing and installing these laser systems, they often require constant supervision and a high level of maintenance to keep them operating at peak efficiency. Because of these factors, high power continuous wave or pulsed gas lasers are often unsuitable for a number of applications where mobility, size, weight or freedom from frequent service and maintenance are prime considerations.

In response to this need for lightweight, high powered laser systems, slab laser systems were developed. Slab lasers generally incorporate two or more laser slabs (or plates) which are stacked on top of and spaced apart from each other to form gaps between the slabs. These gaps are filled with a lasing medium, forming a laser cavity, which is excited by applying energy to adjacent slabs to produce a laser beam. There are numerous benefits associated with slab lasers when compared to their pulsed or CW laser forced gas counterparts. Slab lasers are very simple in design, have no moving parts, require little maintenance, and are inexpensive to manufacture.

Concerning slab laser systems, it is well known that by decreasing the size of the gap between the individual slabs, the power output of the individual laser beam being generated between each slab increases. However, there are physical limitations as to how narrow this gap can be made. When the gap becomes too small, the laser beam interacts more intensely with the slabs, which results in the slabs becoming excessively hot. This heating of the slabs substantially reduces the output of the individual laser beams causing a substantial reduction in operating efficiency.

In order to increase the power output of a slab laser system, additional slabs can be stacked upon each other to form additional gaps and produce additional laser beams. These additional laser beams, through the use of mirrors or other reflective devices, can then be combined into a single beam.

However, there are problems associated with these multiple beam slab laser systems. While the numerous laser beams generated between the individual slabs of the slab laser system can be combined into a single output beam, the phase of each of the individual laser beams is not synchronized and, therefore, the single output beam will not be coherent. This can result in the individual laser beams destructively interfering with each other, substantially reducing the focussing ability and uniformity of the single output beam.

SUMMARY OF INVENTION

It is therefore an object of this invention to provide an improved coherent multiple beam laser system.

It is a further object of this invention to provide such a laser system which synchronizes the phase of the individual laser beam outputs, allowing these individual laser beams to be combined into a single coherent output beam.

It is a further object of this invention to provide such a laser system which incorporates no moving parts and greatly reduces the need for supervision and maintenance.

It is a further object of this invention to provide such a laser system which has reduced thermal control requirements, is compact in design and may be coupled into a high power fiber optic beam delivery system.

It is a further object of this invention to provide such a laser system which can operate as both a continuous power laser system and a pulsed laser system.

It is a further object of this invention to provide such a laser system which is modular in design so that the power output of the laser system can be custom tailored to meet the needs of the user.

This invention results from the realization that the phase of the individual laser beams of a multiple beam slab laser system can be synchronized by feeding back a portion of one or more of the individual laser beams to the remaining laser beams and combining them to form a single coherent output beam.

This invention features a coherent multiple beam laser system including a plurality of slab lasers and a feedback device responsive to an output of at least one slab laser for feeding back a portion of the slab laser output to the remaining slab lasers for synchronizing the output phase of all the slab lasers.

In a preferred embodiment, the plurality of slab lasers may include a plurality of slabs essentially parallel to and spaced from each other for forming gaps therebetween in which each gap is filled with a lasing medium. There may be means for exciting the plurality of slab lasers for generating the slab laser outputs. The means for exciting may include at least one RF generator connected between alternating slabs in the plurality of slabs. The means for exciting may include a waveguide in each gap and at least one microwave source coupled with the plurality of waveguides. The means for exciting may include at least one AC generator connected between alternating slabs in the plurality of slabs.

The means for exciting may include at least one DC generator connected between alternating slabs in the plurality of slabs. The plurality of slabs may be stacked to form a slab laser module. There may be a resonant cavity surrounding at least one of the slab laser modules and responsive to the plurality of slab laser outputs for producing a plurality of laser beams. The resonant cavity may be an unstable resonator including a primary reflective device positioned at a first end of the unstable resonator and a secondary reflective device positioned at a second end of said unstable resonator. The primary reflective device may be convex shaped and the secondary reflective device may be concave shaped. The secondary reflective device may include a raised center section. The secondary reflective device may further include a retroreflector. The reflective devices may be mirrors. The plurality of laser beams may be repeatedly reflected between the primary reflective device and the secondary reflective device. The curvature of the primary reflective device may be different from the curvature of the secondary reflective device for directing the plurality of laser beams toward at least one exit aperture in the unstable resonator. There may be a beam compacting device responsive to the plurality of laser beams passing through at least one exit aperture for combining the plurality of laser beams into a composite output beam. The beam compacting device may include at least one output collecting mirror. The at least one exit aperture may include a first and a second exit aperture. The at least one output collecting mirror may include a first outer collecting mirror, a second outer collecting mirror and an intermediate collecting mirror. The first outer collecting mirror may be positioned proximate the first exit aperture, the second outer collecting mirror may be positioned proximate the second exit aperture and the intermediate collecting mirror may be positioned between the first and second outer collecting mirrors. The plurality of laser beams exiting the unstable resonator may strike the first and second outer collecting mirrors and then be directed toward the intermediate collecting mirror where the plurality of laser beams are combined to form the composite output beam. The first and second apertures may be in the middle of the unstable resonator. The first and second exit apertures may be peripheral to the unstable resonator. There may be means for cooling a plurality of slab lasers, the means for cooling may include a circulation system which circulates a cooling medium through the plurality of slab lasers. At least one slab includes at least one cooling passage for circulating the cooling medium through the plurality of slab lasers to remove heat from the plurality of slab lasers. The circulation system may include a heat exchanger for removing heat from the cooling medium. The cooling medium may be a liquid chosen from the group of liquids consisting of: water; glycol; nitrogen; helium; hydrogen; air; oxygen; methane; carbon tetrafluoride; ethylene; ethane; nitrous oxide; carbon dioxide; propane; monochlorotrifluoromethane; ammonia; isobutane; sulphur dioxide; monochlorodifluoromethane; methylchloride; butane; dichlorodifluoromethane; ethyl ether; methylene chloride; dichlorotetrafluoroethane; freon; glycol-water mixtures; dichloromonofluoromethane; sodium-potassium eutectic solution; trichloromonofluoromethane; liquid metal; and trichlorotrifluoroethane. The cooling medium may be a gas and may be chosen from a group of gasses consisting of: nitrogen; helium; hydrogen; air; oxygen; methane; carbon tetrafluoride; ethylene; ethane; nitrous oxide; carbon dioxide; propane; monochlorotrifluoromethane; ammonia; isobutane; sulphur dioxide; monochlorodifluoromethane; methylchloride; butane; dichlorodifluoromethane; ethyl ether; methylene chloride; dichlorotetrafluoroethane; freon; glycol-water mixtures; dichloromonofluoromethane; sodium-potassium eutectic solution; trichloromonofluoromethane; liquid metal; and trichlorotrifluoroethane. The lasing medium may be a gaseous lasing medium chosen from the group consisting of: carbon dioxide; nitrogen; helium; oxygen; hydrogen; fluorine; chlorine; bromine; iodine; carbon monoxide; nitrous oxide; ammonia; copper vapor; cadmium vapor; hydrogen chloride; hydrogen fluoride; water vapor; argon; krypton; neon; xenon; mercury vapor; magnesium vapor; sodium vapor; lithium vapor; potassium vapor; cadmium vapor; zinc vapor; thallium vapor; indium vapor; deuterium; cyanogen; hydrogen cyanide; methyl alcohol vapor; nitrous oxide and carbon disulfide. The feedback device may include a means for directing a portion of at least one slab laser output from one slab laser to another slab laser for synchronizing the phase of the plurality of laser beams by synchronizing the phase of the outputs of all the slab lasers producing a coherent composite output beam. The means for directing may include a reflective device for generating the feedback portion by reflecting a percentage of the slab laser output. The percentage reflected may be between 0.1% and 10.0%. The at least one reflective device positioned within the unstable resonator may include at least one convex subsection for reflecting the feedback portion into the lasing mediums of adjacent slab lasers. At least one of the reflective devices positioned within the unstable resonator may include at least one v-shaped groove for reflecting the feedback portion into the lasing mediums of adjacent slab lasers. The angle of the v-shaped grooves may be essentially 90 degrees. The means for redirecting may include a refractor device for generating the feedback portion by refracting a percentage of the slab laser output. The percentage refracted may be between 0.1% and 10.0%. The gaseous lasing medium may be inherently refractive and the primary and secondary reflective devices and the plurality of slabs in the unstable resonator may be positioned so that the feedback portion is directed into the lasing mediums of adjacent slab lasers. At least one interior convex lens may be placed proximate the plurality of slabs for directing the feedback portion into the lasing mediums of adjacent slab lasers. The means for redirecting may include a diffractor device for generating the feedback portion by diffracting a percentage of the slab laser output. The percentage diffracted may be between 0.1% and 10.0%. The gaseous lasing medium may be inherently diffractive and the primary and secondary reflective devices and the plurality of slabs in the unstable resonator may be positioned so that the feedback portion is directed into the lasing mediums of adjacent slab lasers. At least one of the reflective devices positioned within the unstable resonator may have a dispersive surface of varying reflectivity or of structured surface grating design for directing the feedback portion into the lasing mediums of adjacent slab lasers. The means for redirecting may include a diffractive and refractive device for generating the feedback portion by diffracting and refracting a percentage of the slab laser output. The percentage diffracted and refracted may be between 0.1% and 10.0%. The coherent composite output beam may be introduced into a fiber optic cable. The unstable resonator may surround the plurality of slab laser modules stacked in the first dimension in which the feedback portion is fed back between adjacent slab laser modules by reflecting between the primary reflective device and the secondary reflective device. The unstable resonator may surround the plurality of slab laser modules stacked in a second dimension and the primary and secondary reflective devices may each include at least one retroreflector spanning the space between adjacent slab laser modules in which the feedback portion is fed back between the adjacent slab laser modules by reflecting on the retroreflector. The plurality of unstable resonators may be stacked in a third dimension and the feedback portion fed back between adjacent unstable resonators through a passage connecting the adjacent unstable resonators.

The invention also features a coherent multiple beam laser system including a plurality of slabs essentially parallel to and spaced from each other for forming gaps therebetween in which each gap is filled with a lasing medium. A resonant cavity surrounds the plurality of slabs and the plurality of lasing mediums. There are means for exciting the plurality of lasing mediums for producing a plurality of laser beams and a beam compacting device responsive to the plurality of laser beams for forming a composite output beam.

The invention also features a coherent multiple beams laser system including a plurality of slabs essentially parallel to and spaced from each other for forming gaps therebetween in which each gap is filled with a lasing medium. There is a resonant cavity surrounding the plurality of slabs and the plurality of lasing mediums. There are means for exciting the plurality of lasing mediums for producing a plurality of laser beams and means for redirecting a portion of at least one laser beam from the first lasing medium to other lasing mediums to stimulate emission coherent with the first lasing medium; a beam compacting device responsive to the plurality of laser beams forms a composite output beam.

DISCLOSURE OF PREFERRED EMBODIMENT

Other objects, features and advantages will occur to those skilled in the art from the following description of a preferred embodiment and the accompanying drawings, in which.

Figure 4:
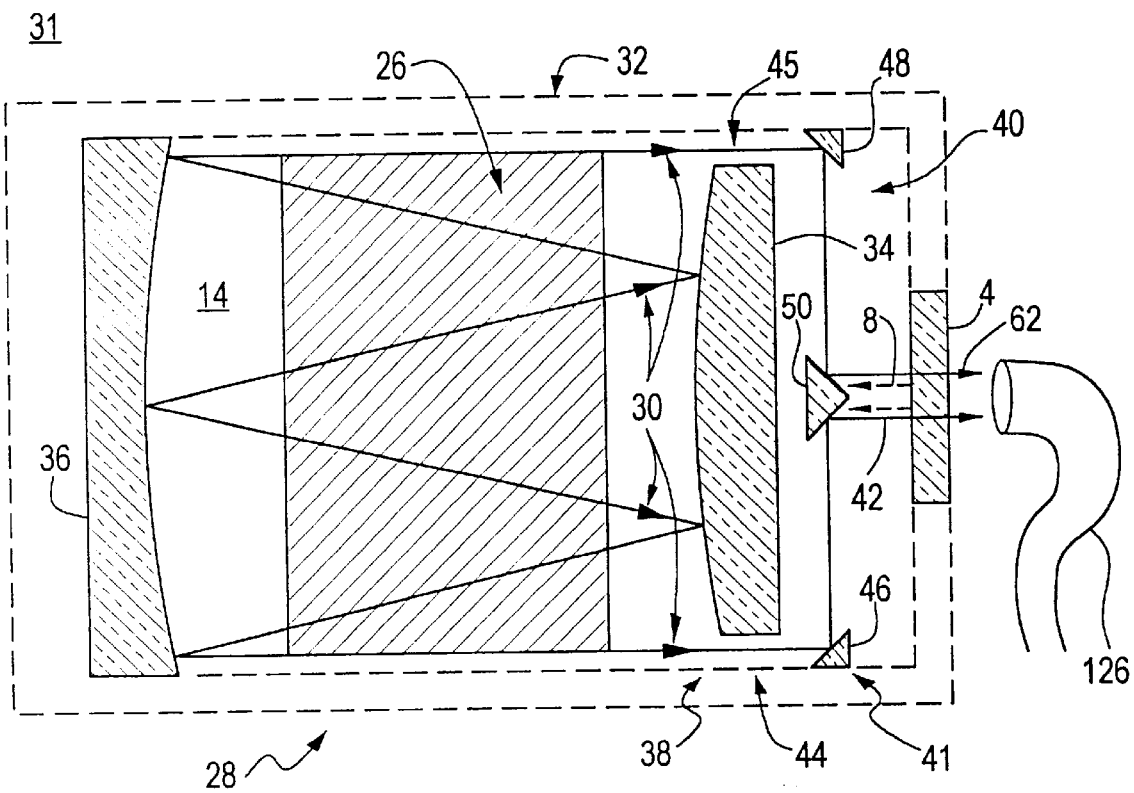
FIG. 4 is a cross-sectional view taken along line 4—4 of FIG. 5 of one embodiment of the coherent multiple beam laser system of this invention in which the individual laser beams generated within the resonant cavity exit adjacent the sides of the laser system.
Figure 6:
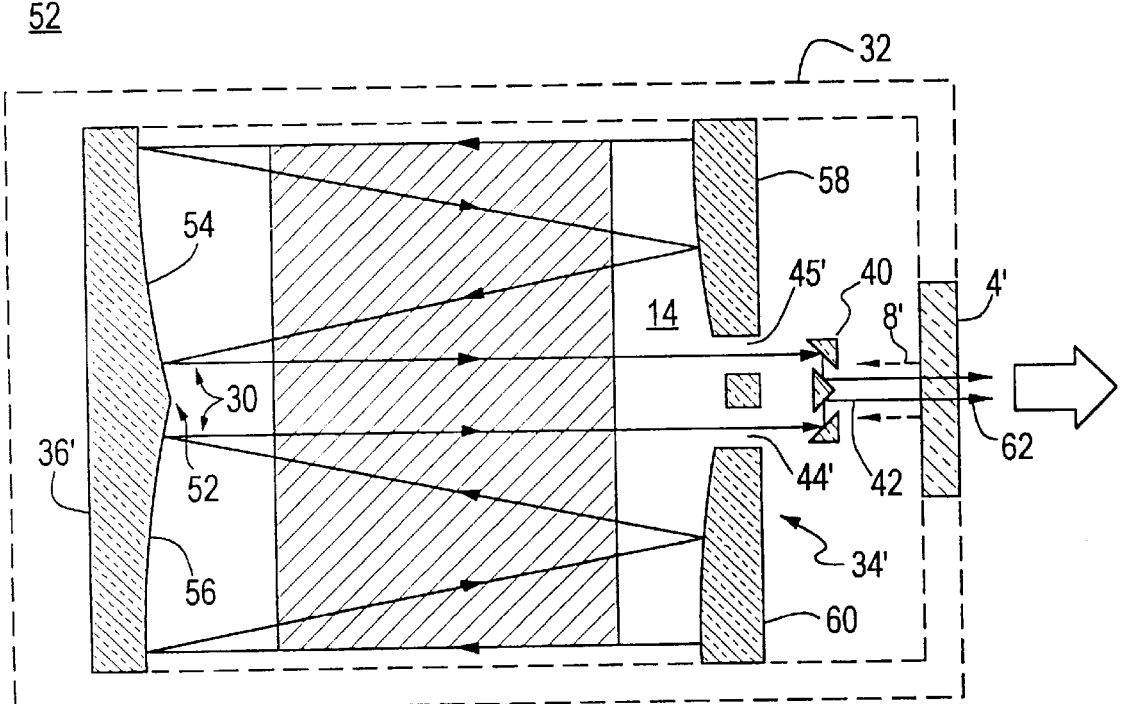
FIG. 6 is a cross-sectional view taken along line 6—6 of FIG. 7 of another embodiment of the coherent multiple beam laser system of this invention in which the individual laser beams generated within the resonant cavity exit from the center of the laser system.
Figure 8:
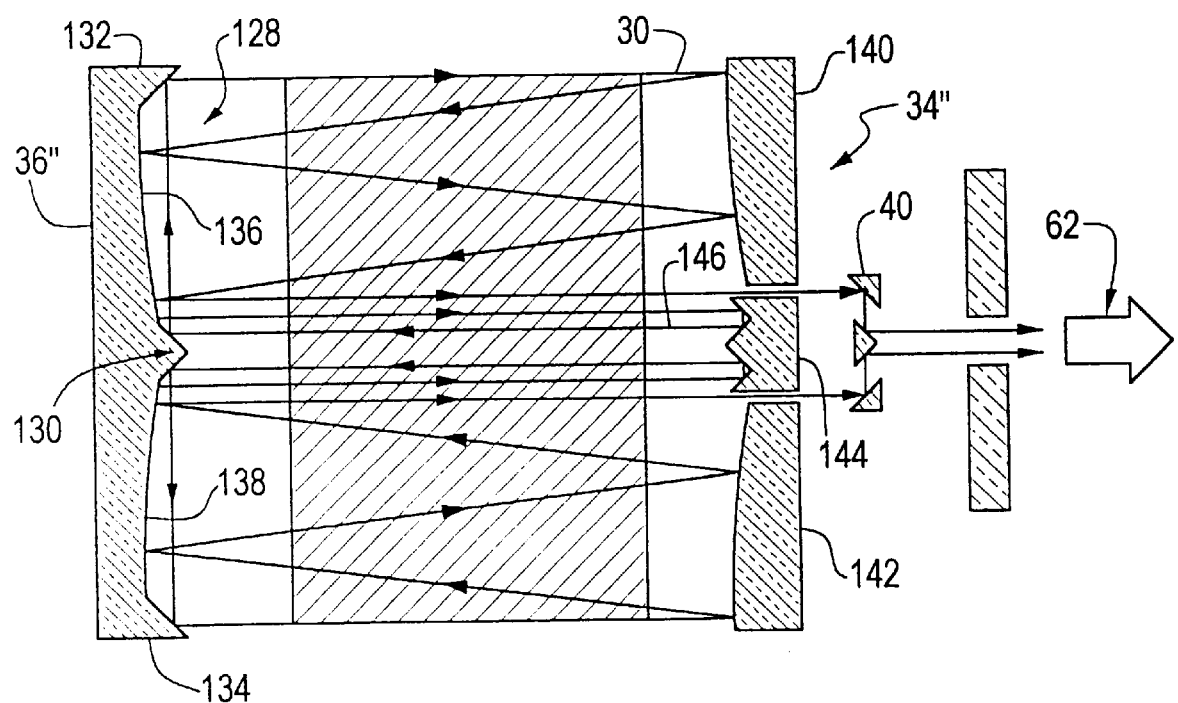
Figure 9A:
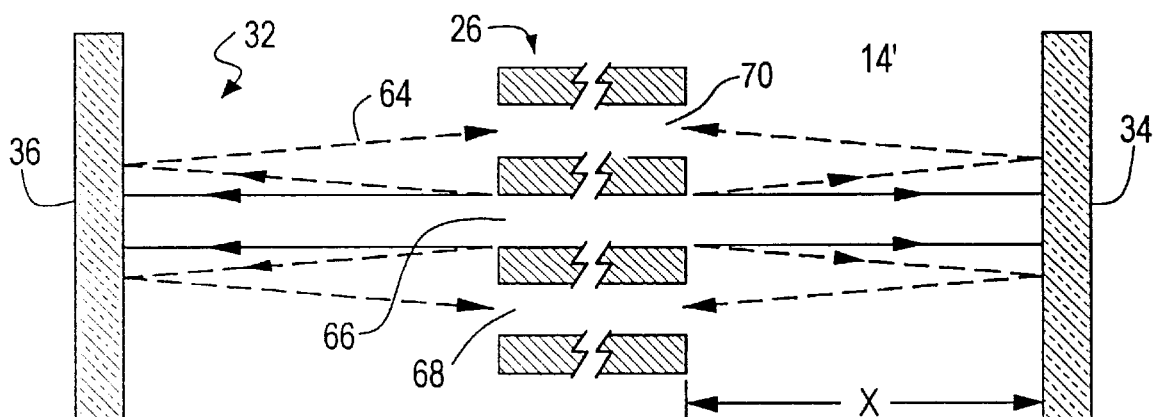
Figure 9B:
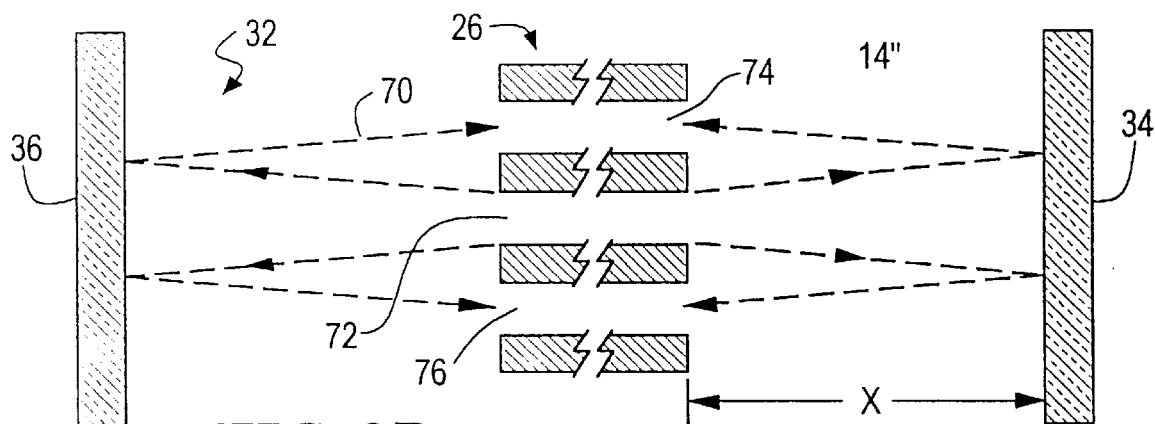
Figure 9C:
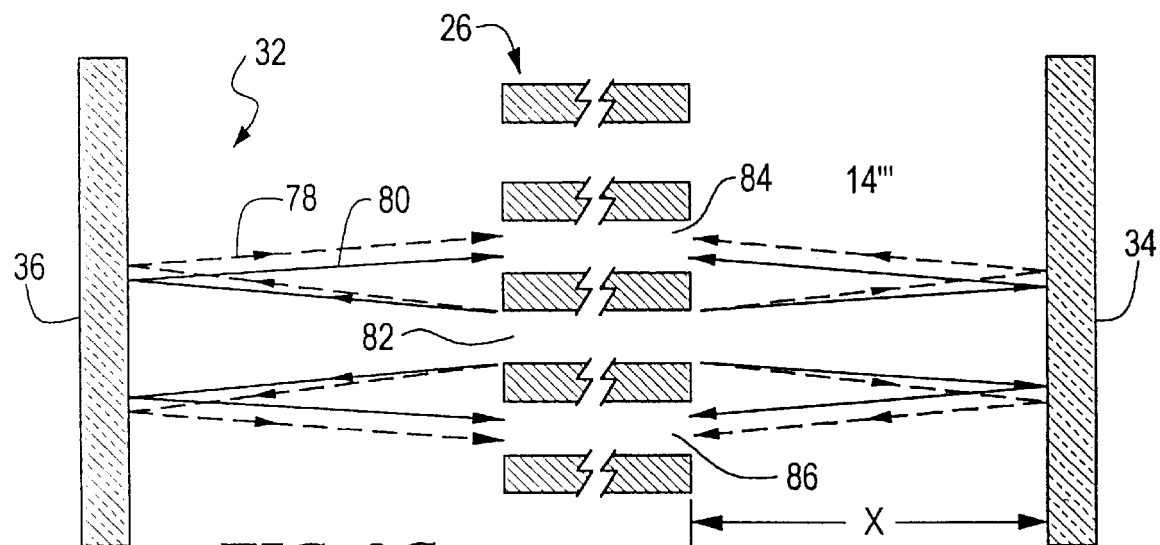
Figure 10A:
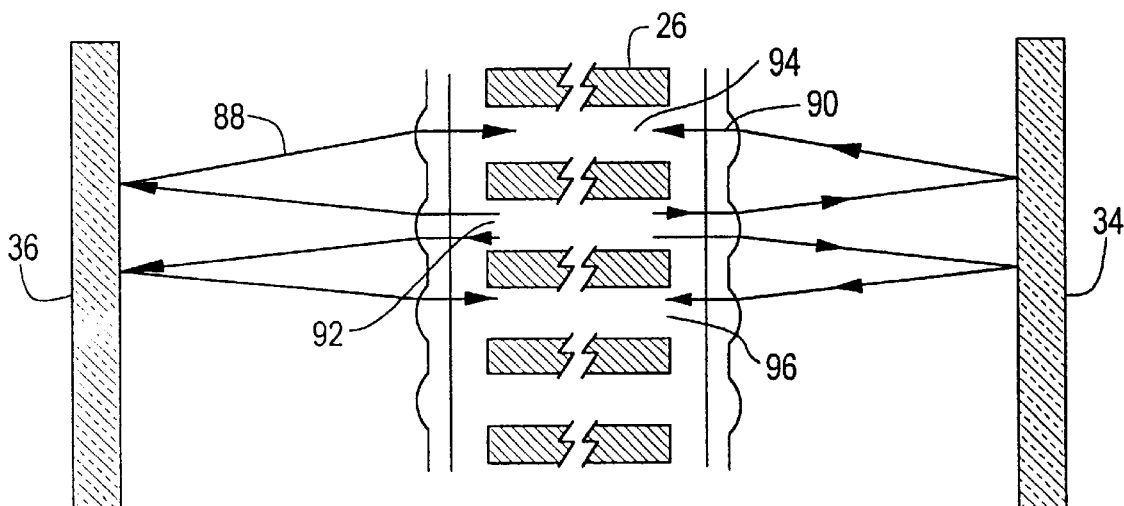
Figure 10B:
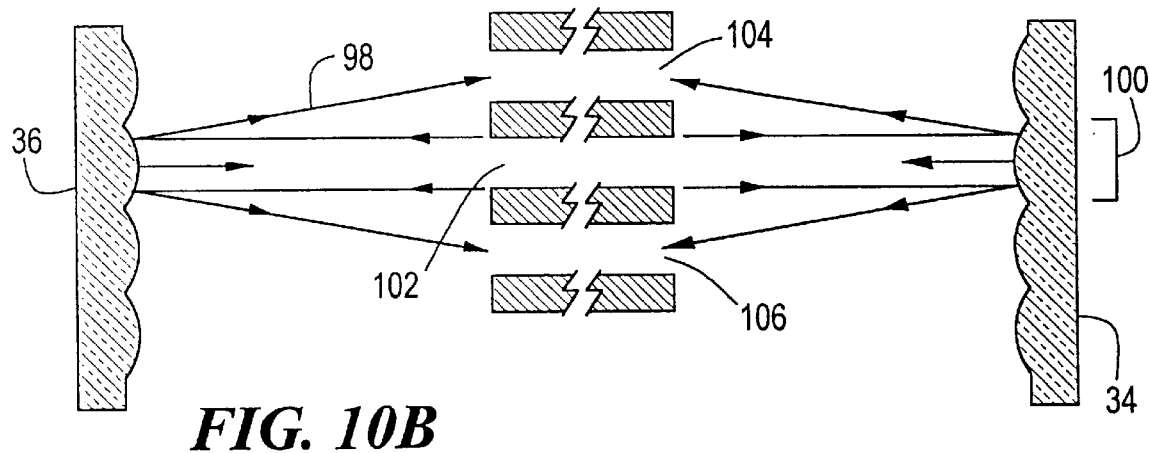
Figure 10C:
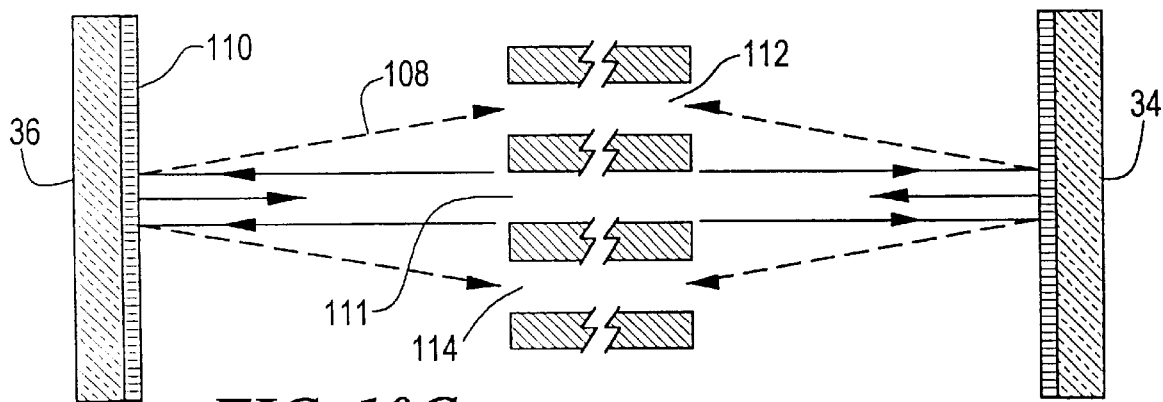
Figure 10D:
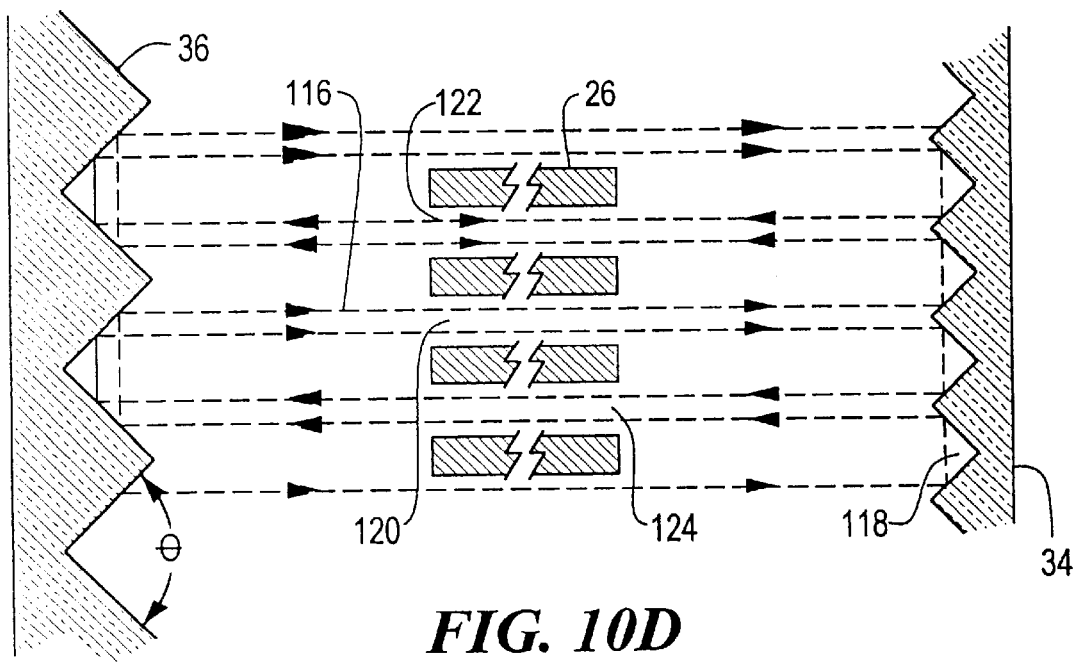
Figure 11:
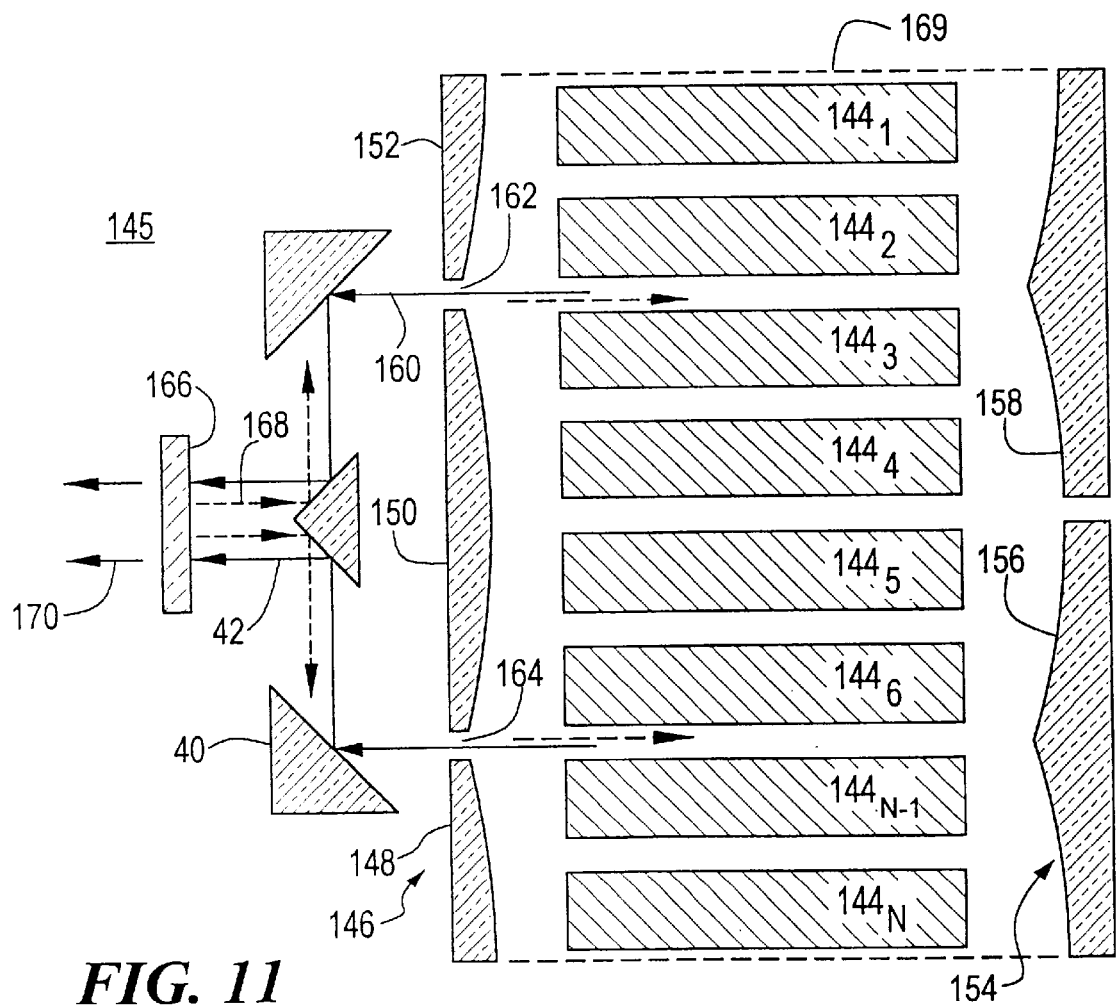
Figure 12:
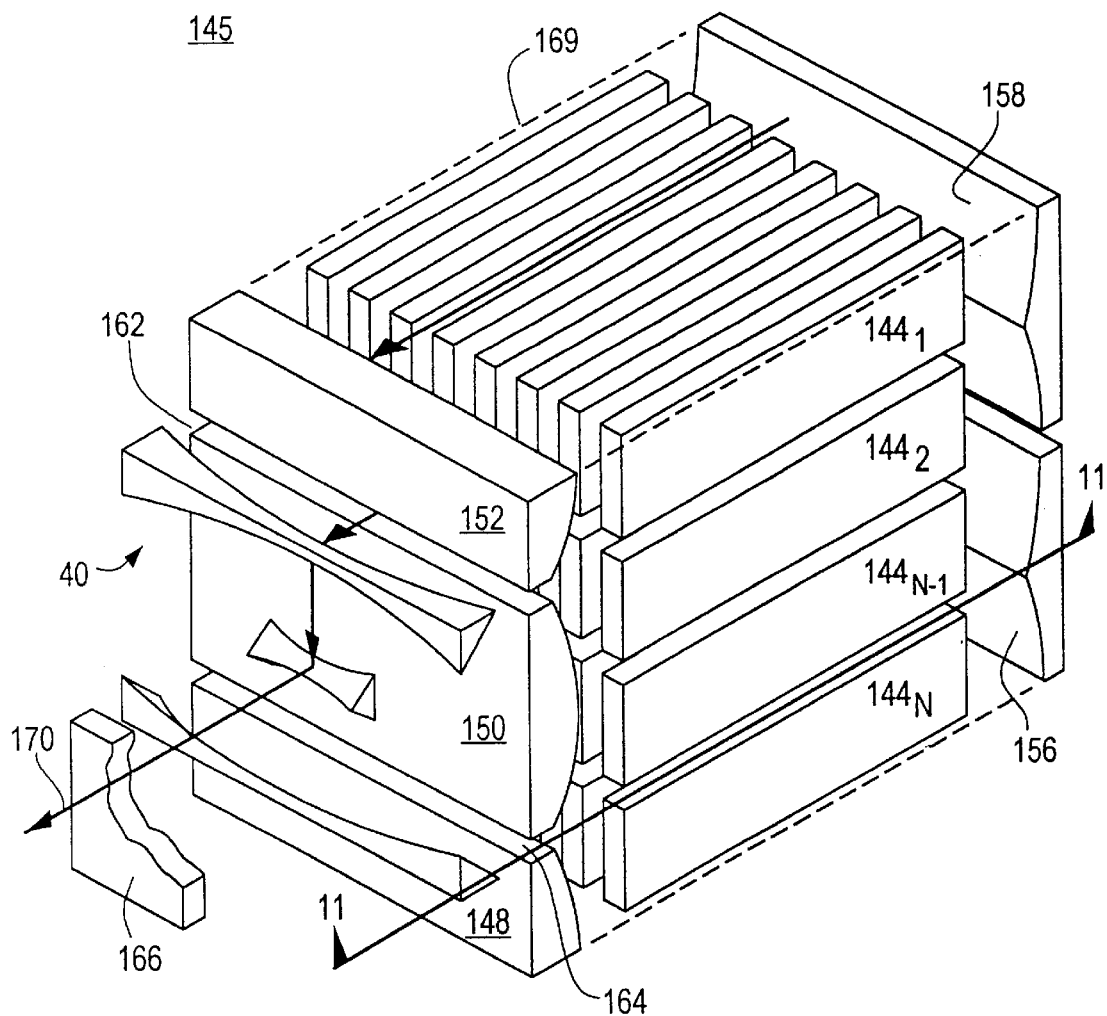
Figure 13:
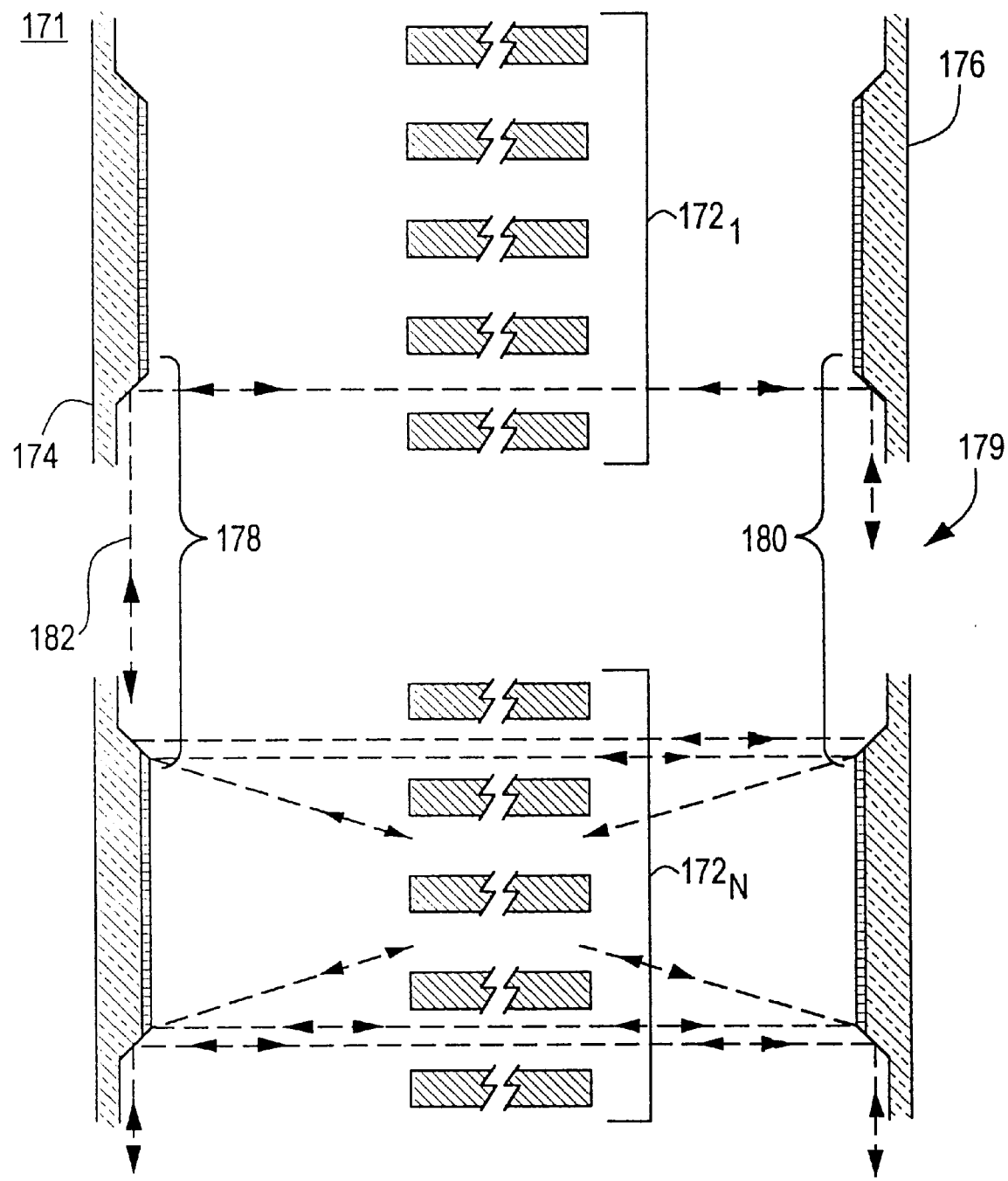
Figure 14:
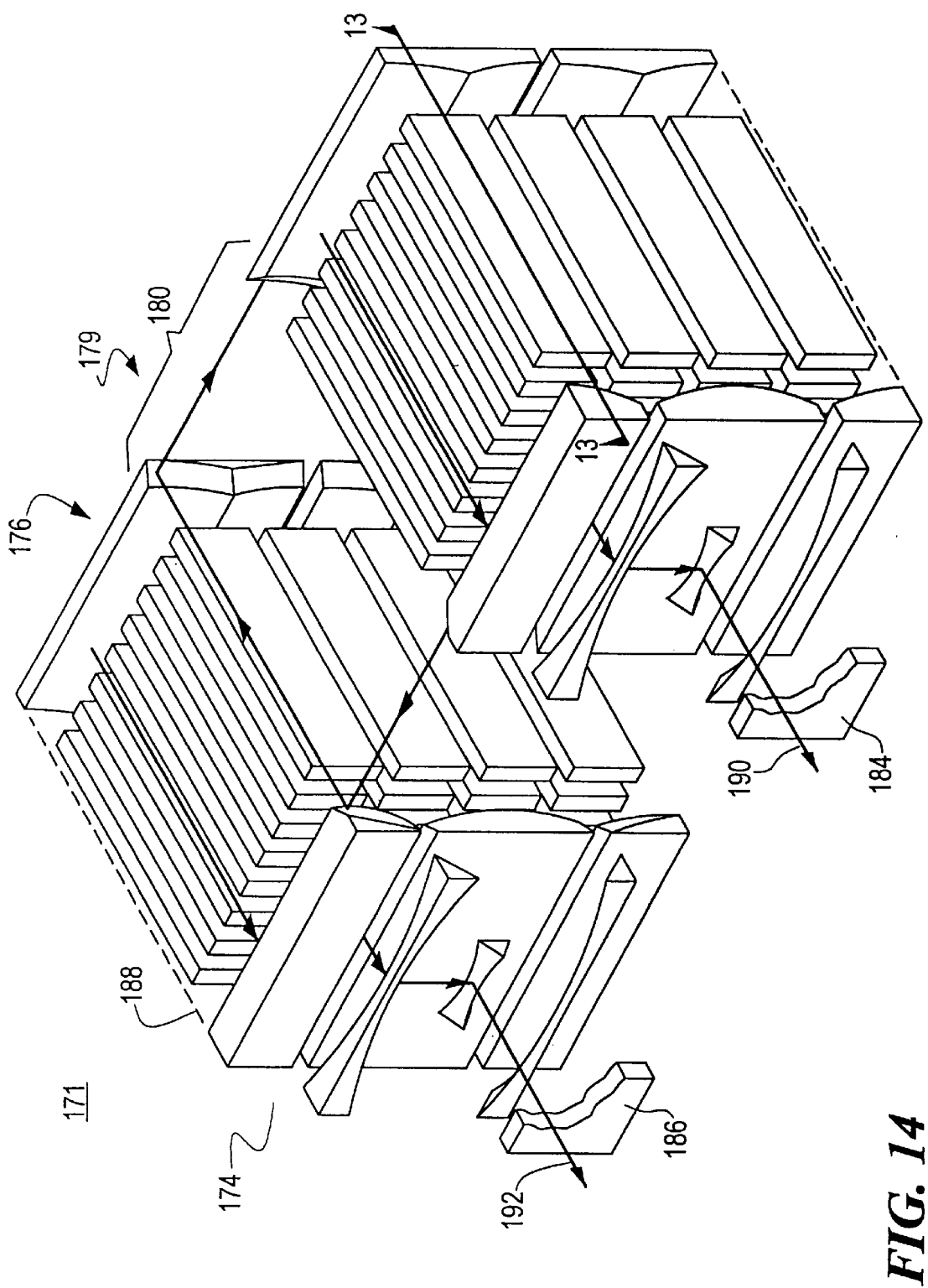
Figure 15:
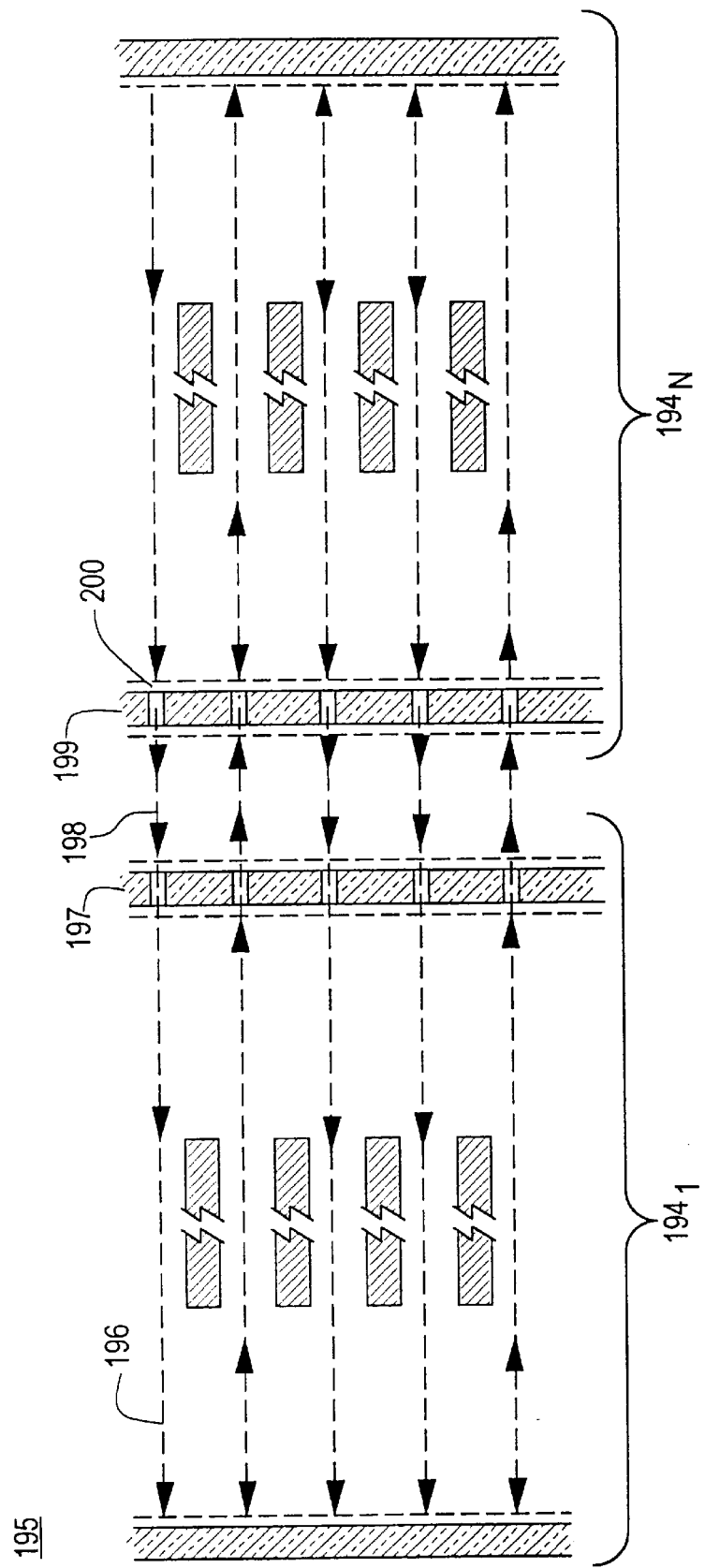
Figure 16:
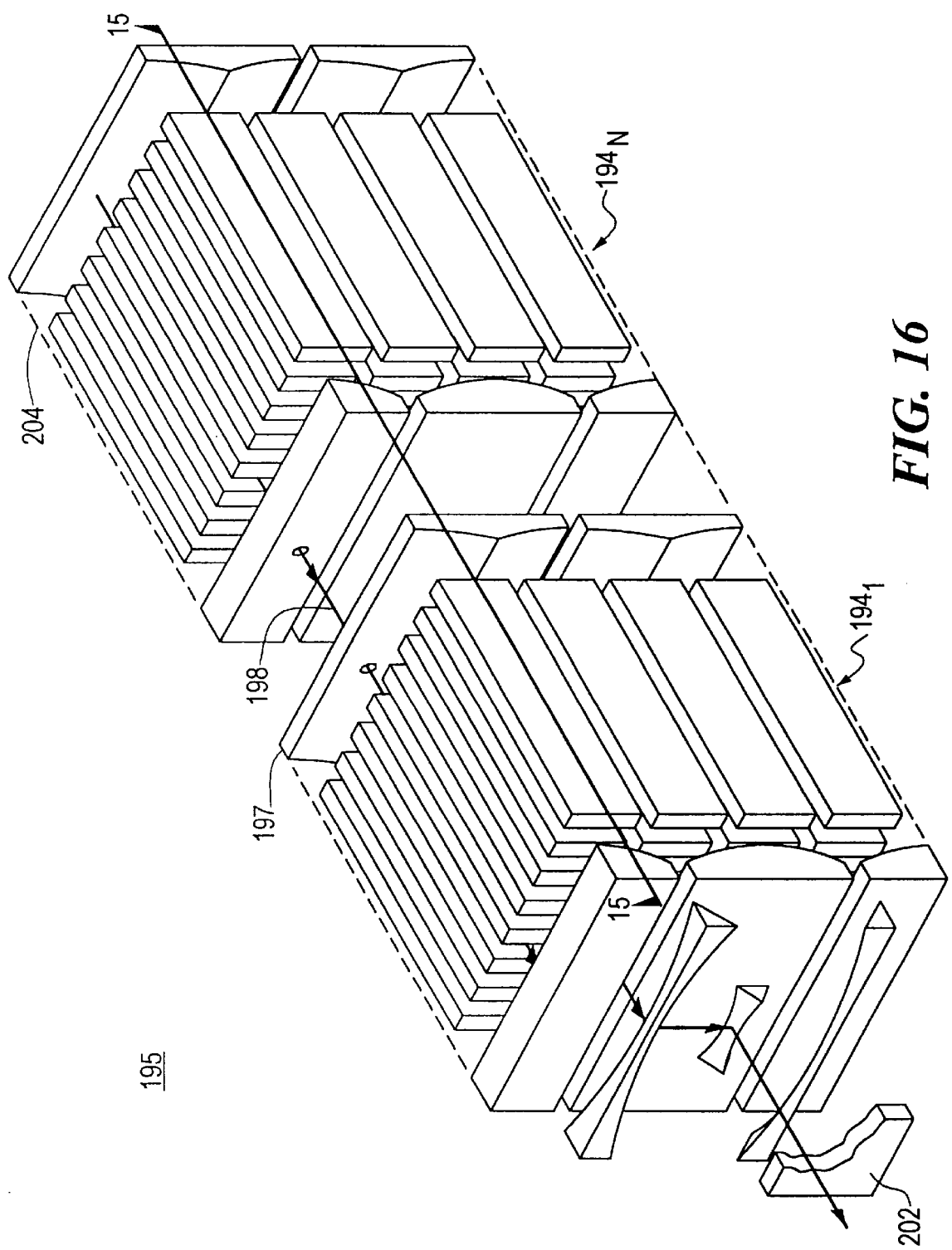
Figure 17:
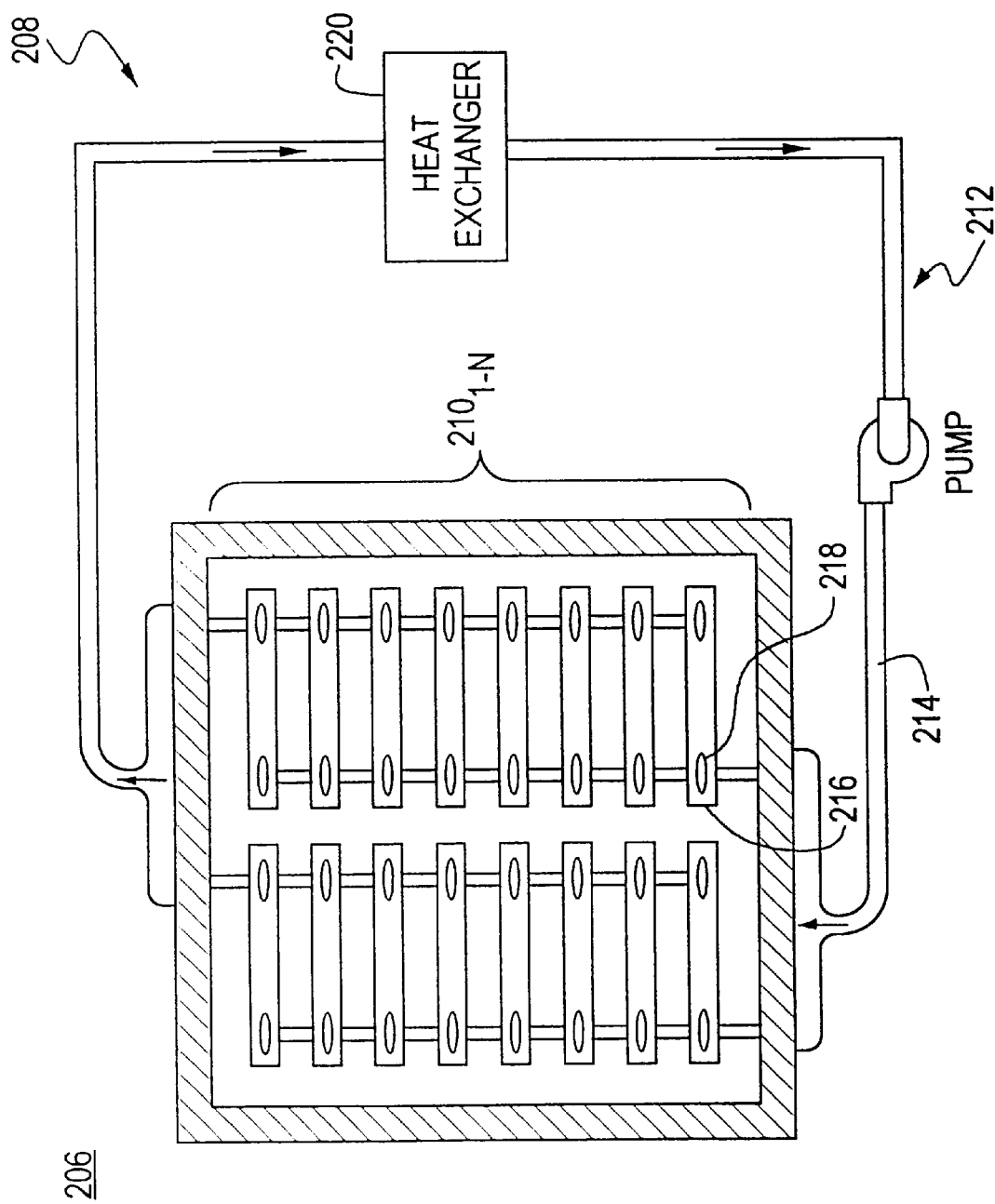

FIG. 8 is a cross-sectional view similar to FIGS. 4 and 6 of another embodiment of the coherent multiple beam laser system of this invention in which the individual laser beams generated within the resonant cavity exit from the center of the laser system and a portion of one or more of the individual laser beams is fed back to the remaining laser beams through the use of retroreflectors incorporated into the primary and secondary reflective devices;

FIG. 9A is a cross-sectional view of the coherent multiple beam laser system of this invention in which feedback occurs through natural diffraction;

FIG. 9B is a view similar to FIG. 9A in which feedback occurs through natural refraction;

FIG. 9C is a view similar to FIG. 9A in which feedback occurs through a combination of natural diffraction and natural refraction;

FIG. 10A is a cross-sectional view of the coherent multiple beam laser system of this invention in which feedback occurs through induced refraction;

FIG. 10B is a view similar to FIG. 10A in which feedback occurs through induced reflection;

FIG. 10C is a view similar to FIG. 10A in which feedback occurs through induced diffraction;

FIG. 10D is a view similar to FIG. 10A including a retroreflector in which feedback occurs through induced reflection;

FIG. 11 is a cross-sectional view taken along line 11—11 of FIG. 12 of a coherent multiple beam laser system of this invention in which multiple slabs are stacked to form slab laser modules and multiple slab laser modules are arranged in a first dimension to form a coherent multiple beam laser system;

FIG. 12 is a three-dimensional view of the coherent multiple beam laser system shown in FIG. 11;

FIG. 13 is a cross-sectional view taken along line 13—13 of FIG. 14, with portions broken away, of the coherent multiple beam laser system of this invention in which multiple slabs are stacked to form slab laser modules and multiple slab laser modules are arranged in a second dimension where feedback between slab laser modules is accomplished by incorporating retroreflectors into the primary and secondary reflective devices of the laser system;

FIG. 14 is a three-dimensional view of the coherent multiple beam laser system shown in FIG. 13;

FIG. 15 is a cross-sectional view taken along line 15—15 of FIG. 16 of the coherent multiple beam laser system of this invention in which multiple slabs are stacked to form slab laser modules and multiple slab laser modules are arranged in a third dimension where feedback occurs between slab laser modules by one or more individual laser beams traveling through passages connecting adjacent reflective devices;

FIG. 16 is a three-dimensional view of the coherent multiple beam laser system shown in FIG. 15; and FIG. 17 is a cross-sectional schematic view of the coherent multiple beam laser system of this invention including a system for cooling the laser slabs.

Figure 1:
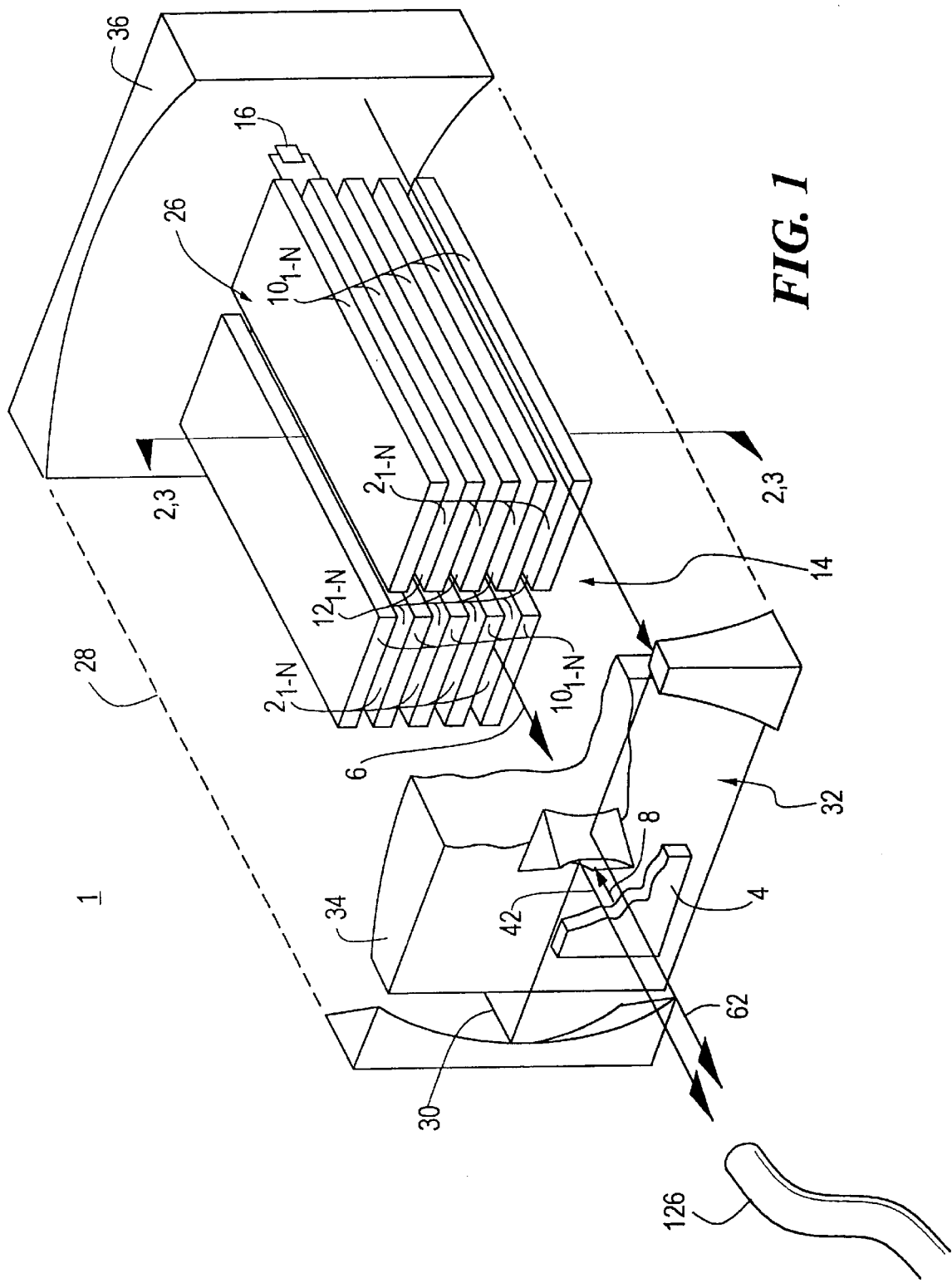
FIG. 1 is a three-dimensional view of the coherent multiple beam laser system of this invention in which a section of the resonant cavity has been cut away in order to show the arrangement of laser slabs.

The coherent multiple beam laser system 1, FIG. 1, according to this invention, includes a plurality of slab lasers $2_{1-n}$ and a feedback device 4 responsive to at least one slab laser output 6 for feeding back a portion 8 of the slab laser output 6 to the remaining slab lasers for synchronizing the phase of the outputs of all slab lasers $2_{1-n}$, FIG. 1. The plurality of slab lasers $2_{1-n}$ include a plurality of slabs $10_{1-n}$ which are essentially parallel to and spaced from each other, for forming gaps $12_{1-n}$ between slabs $10_{1-n}$. The plurality of slabs $10_{1-n}$ may be stacked to form a slab laser module 26. Gaps $12_{1-n}$ and the surrounding enclosed volume are filled with a lasing medium 14. Therefore, a slab laser $2_{1-n}$ is formed when any pair of slabs $10_{1-n}$ are essentially parallel to and spaced from each other to form a gap between the slabs $12_{1-n}$ which is filled with lasing medium 14. The lasing medium 14 filling resonant cavity 28 may be a gaseous lasing medium, such as: carbon dioxide; nitrogen; helium; oxygen; hydrogen; fluorine; chlorine; bromine; iodine; carbon monoxide; nitrous oxide; ammonia; copper vapor; cadmium vapor; hydrogen chloride; hydrogen fluoride; water vapor; argon; krypton; neon; xenon; mercury vapor; magnesium vapor; sodium vapor; lithium vapor; potassium vapor; cadmium vapor; zinc vapor; thallium vapor; indium vapor; deuterium; cyanogen; hydrogen cyanide; methyl alcohol vapor; nitrous oxide and carbon disulfide.

Figure 3:
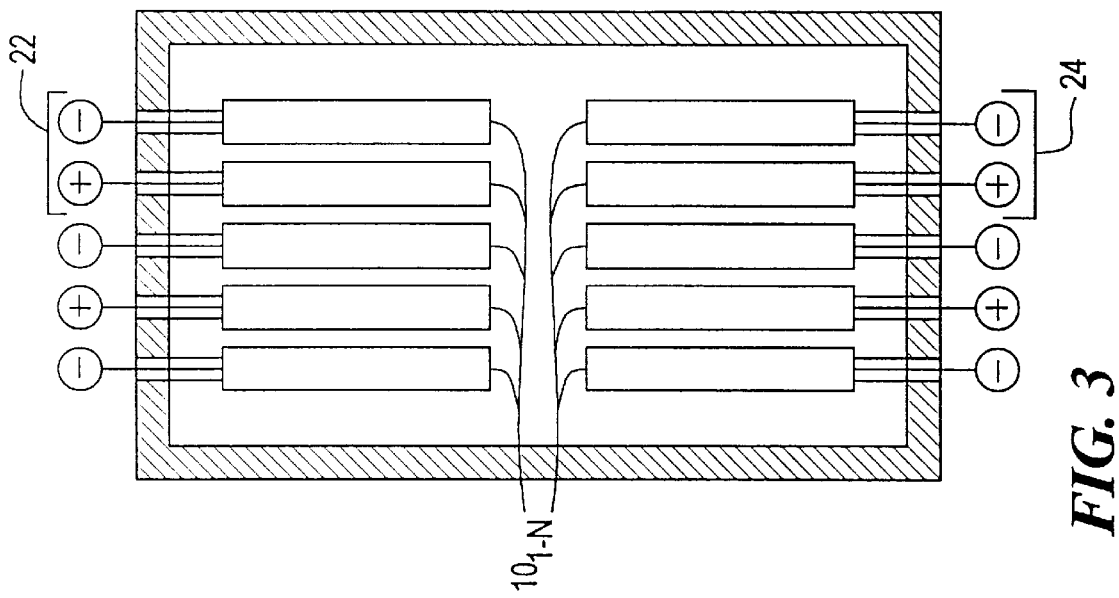
FIG. 3 is a cross-sectional view along line 3—3 of FIG. 1 showing the coherent multiple beam laser system of this invention, similar to FIG. 2, using AC/DC slab excitation sources instead of RF/microwave.
Figure 2:
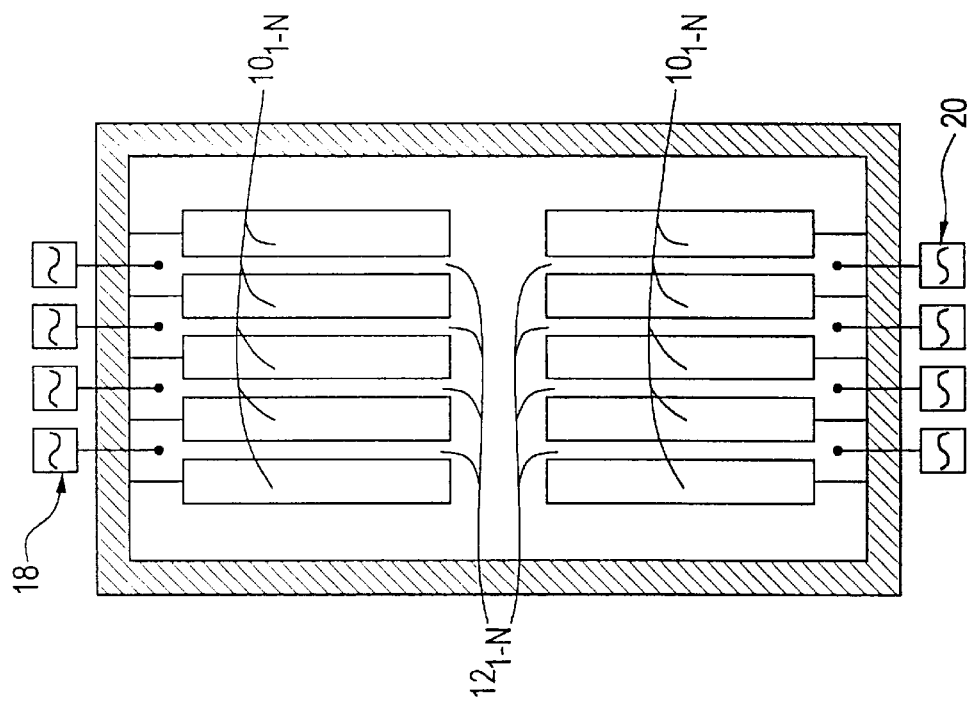
FIG. 2 is a cross-sectional view along line 2—2 of FIG. 1 showing the coherent multiple beam laser system of this invention including a plurality of RF/microwave slab excitation sources.

The coherent multiple beam laser system 1, FIG. 1, may include a means for exciting 16 the plurality of slab lasers $2_{1-n}$ for generating slab laser outputs 6. FIG. 2 and FIG. 3 are cross-sectional views of the coherent multiple beam laser system 1, FIG. 1. Means for exciting 16 may include at least one RF generator 18, FIG. 2, connected between alternating slabs of the plurality of slabs $10_{1-n}$. Means for exciting 16, FIG. 1, may include at least one waveguide and microwave source 20, FIG. 2, positioned in each gap $12_{1-n}$. Alternatively, means for exciting 16, FIG. 1, may include at least one AC generator 22, FIG. 3, or at least one DC generator 24 connected between alternating slabs of the plurality of slabs $10_{1-n}$.

A resonant cavity 28, FIG. 1, surrounds at least one slab laser module 26 and is responsive to the plurality of slab laser outputs 6 for producing a plurality of laser beams 30. Note that for drawing clarity purposes, slab laser output 6 is used to represent a plurality of slab laser outputs. While only one slab laser output (Item 6, FIG. 1) is shown, each slab laser $2_{1-n}$ can produce a slab laser output 6. Resonant cavity 28, FIG. 4, of coherent multiple beam laser system 31 may be an unstable resonator 32 which includes a primary reflective device 34 positioned at a first end of unstable resonator 32 and a secondary reflective device 36 positioned at a second end of unstable resonator 32. Primary reflective device 34 may be convex shaped and secondary reflective device 36 may be concave shaped. Additionally, both primary and secondary reflective devices 34 and 36 may be mirrors. The plurality of laser beams 30 is repeatedly reflected between primary reflective device 34 and secondary reflective device 36.

The curvature of the primary reflective device 34 is different from the curvature of the secondary reflective device 36. This difference in curvature directs the plurality of laser beams 30 towards at least one exit aperture 38 in unstable resonator 32. Coherent multiple beam laser system 31 may include a beam compacting device 40, responsive to the plurality of laser beams 30 passing through the exit aperture(s) 38 in unstable resonator 32, for combining the plurality of laser beams 30 into a composite output beam 42. Beam compacting device 40 includes at least one output collecting mirror 41. In a preferred embodiment, unstable resonator 32 includes a first exit aperture 44 and a second exit aperture 45. Additionally, beam compacting device 40 may include a first outer collecting mirror 46, a second outer collecting mirror 48, and an intermediate collecting mirror 50. First outer collecting mirror 46 is positioned proximate first exit aperture 44, second outer collecting mirror 48 is positioned proximate second exit aperture 45, and intermediate collecting mirror 50 is positioned between outer collecting mirror 46 and 48. When the plurality of laser beams 30 pass through exit apertures 44 and 45, they strike outer collecting mirrors 46 and 48 and are redirected toward intermediate collecting mirror 50, where the plurality of laser beams 30 are combined to form composite output beam 42.

In a preferred embodiment, exit apertures 44 and 45 are positioned peripheral to unstable resonator 32. This allows the plurality of laser beams 30 to exit unstable resonator 32 along the edges of unstable resonator 32.

Figure 5:
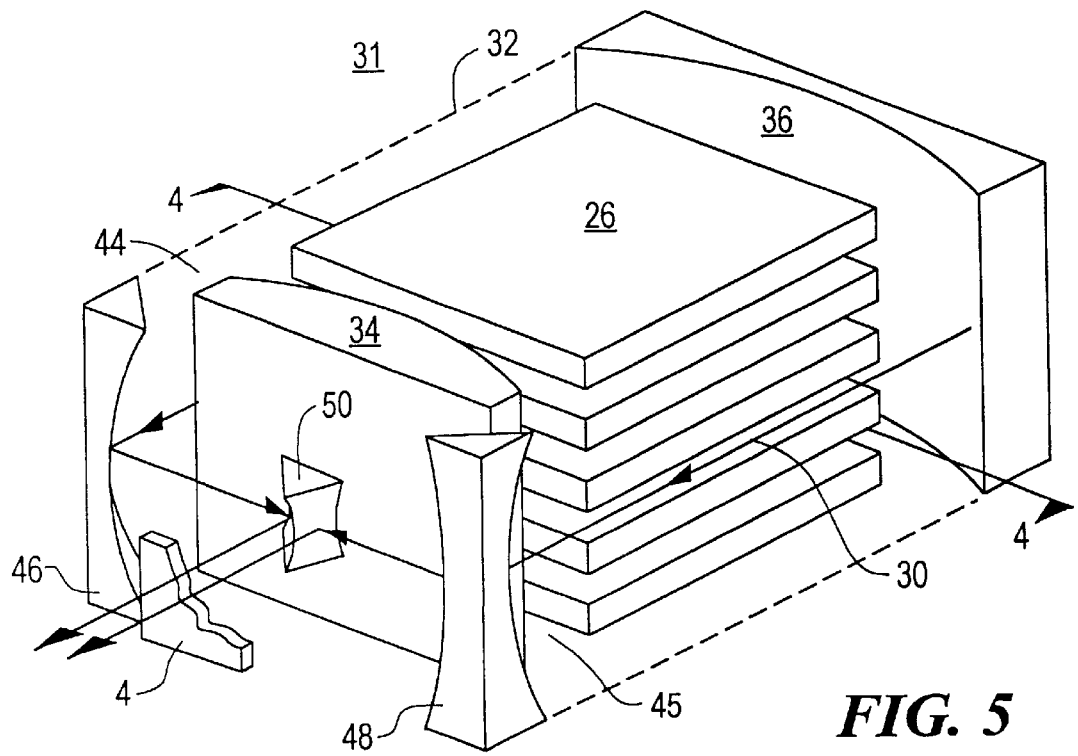
FIG. 5 is a three-dimensional view of the coherent multiple beam laser system shown in FIG. 4.

A three-dimensional view of the coherent multiple beam laser system 31 with portions of feedback device 4 and unstable resonator 32 removed for illustration purposes is shown in FIG. 5.

In an alternative embodiment of the coherent multiple beam laser system 52, FIG. 6, exit apertures 44' and 45' are positioned in the middle of unstable resonator 32. Secondary reflective device 36', while concave in curvature, has a raised center section 52 and resembles a standard concave mirror that was sectioned into two halves 54 and 56 which were swapped side to side to form raised center section 52. Similarly, primary reflective device 34', while convex in curvature, was similarly split into two halves 58 and 60 which were swapped from side to side and spaced apart from each other to form exit apertures 44' and 45'. Similar to the laser system shown in FIG. 4, beam compacting device 40, FIG. 6, is used to combine the plurality of laser beams 30 into composite output beam 42. Feedback device 4' may provide feedback portion 8' to unstable resonator 32.

Figure 7:
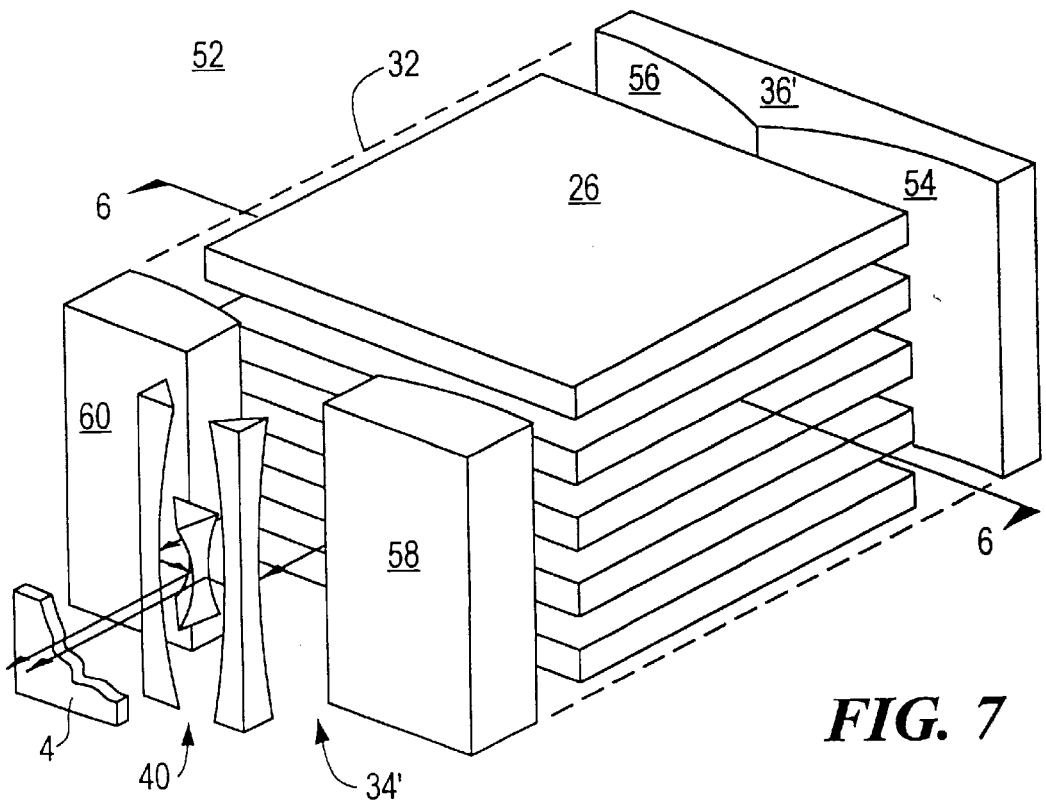
FIG. 7 is a three-dimensional view of the coherent multiple beam laser system shown in FIG. 6.

A three-dimensional view of the coherent multiple beam laser system 52 with sections of feedback device 4' and unstable resonator 32 removed for illustration purposes is shown in FIG. 7.

Feedback device 4, FIG. 1, may include a means for redirecting a percentage of at least one of the slab laser outputs 6 from the slab laser in which it was generated to any other slab laser $2_{1-n}$ for synchronizing the phase of the plurality of laser beams 30 by synchronizing the phase of the outputs 6 of all slab lasers $2_{1-n}$, producing coherent composite output beam 62. Coherent composite output beam 62 may be fed into a fiber-optic cable 126 for use at a remote location.

An aspect of this invention is the percentage fed back, or reflected, refracted, or diffracted, into the plurality of slab lasers $2_{1-n}$. This percentage is preferably between 0.1% and 10.0%. Provided the feedback is sufficient, the outputs 6 of all slab lasers $2_{1-n}$ become phase coherent and synchronized and, therefore, coherent composite output beam 62 is produced.

The feedback portion may be generated as the composite output beam 42 exits unstable resonator 32. Alternatively, the feedback portion may be generated while the plurality of laser beams 30 are reflecting between primary reflective device 34 and secondary reflective device 36. This feedback portion generation can be induced or can occur naturally.

If an inherently diffractive lasing medium 14', FIG. 9A, is used to fill unstable resonator 32 and the primary and secondary reflective devices 34 and 36 are positioned the proper distance "x" from slab laser module 26, feedback portion 64 is generated naturally and is directed from the gap in which the feed back portion originated 66 to the lasing mediums of adjacent slab lasers 68 and 70.

If the lasing medium used is inherently refractive 14", FIG. 9B, the position of primary and secondary reflective devices 34 and 36 can be positioned the proper distance "x" from slab laser module 26 so that feedback portion 70 is generated naturally and is directed from the gap in which the feedback portion originated 72 to the lasing mediums of adjacent slab lasers 74 and 76.

Similarly, if the lasing medium utilized is both inherently diffractive and inherently refractive 14''', FIG. 9C, the spacing "x" between primary and secondary reflective devices 34 and 36 and slab laser module 26 can be adjusted so that diffractive feedback portion 78 and refractive feedback portion 80 occur naturally and travel from the gap in which they originated 82 to the lasing mediums of adjacent slab lasers 84 and 86.

The following chart specifies the proper spacing "x" between the primary and secondary reflective devices 34 and 36 and slab laser module 26 so that natural diffraction and/or refraction occurs. The spacing is determined in accordance with the wavelength of the laser beam produced. All calculations are for a slab thickness of 5 mm and a gap thickness of 3 mm.

| Laser Wavelength | Diffractive Spacing "x" | Refractive Spacing "x" |
| --- | --- | --- |
| 10 microns | 7.5 cm | 3.0 cm |
| 5 microns | 15.0 cm | 1.5 cm |
| 2.5 microns | 30.0 cm | 0.75 cm |

Alternatively, the feedback portion generated can be induced. If feedback portion 88, FIG. 10A, is generated through induced refraction, at least one interior convex lens 90 may be positioned proximate slab laser module 26 for directing feedback portion 88 from the gap in which it originated 92 to the lasing mediums of adjacent slab lasers 94 and 96.

If feedback portion 98, FIG. 10B, is generated through induced reflection, at least one of the primary or secondary reflective devices 34 and 36 may include at least one convex sub-portion 100 for directing feedback portion 98 from the gap in which it originated 102 to the lasing mediums of adjacent slab lasers 104 and 106.

Feedback portion 108, FIG. 10C, can be generated by induced diffraction by utilizing at least one primary or secondary reflective device 34 or 36 which has a dispersive surface (such as a grating) of either varying reflectivity or structured surface grating design 110 for directing feedback portion 108 from the gap in which it originated 111 to the lasing mediums of adjacent slab lasers 112 and 114.

At least one of the primary or secondary reflective devices 34 or 36, FIG 10D, may include at least one v-shaped groove 118 for generating feedback portion 116 through induced reflection by directing feedback portion 116 from the gap in which it originated 120 to the lasing mediums of adjacent slab lasers 122 and 124. These v-shaped grooves 118, FIG. 10D, may have an angle θ of essentially 90°.

In an alternative embodiment utilizing induced reflection, secondary reflective device 36'', FIG. 8, may include a retroreflector 128 and secondary reflective device has a raised center section 130 and raised end sections 132 and 134. Secondary reflective device 36'', FIG. 8, has two concave sections 136 and 138 similar to secondary reflective device 36', FIG. 6. Primary reflective device 34'' is similar to primary reflective device 34', FIG. 6, and is constructed of two convex sections 140 and 142, FIG. 8. A primary retroreflector 144 directs feedback portion 146, via retroreflector 128, into the lasing mediums of adjacent slab lasers. Beam compacting device 40 combines the plurality of laser beams 30 into a coherent composite output beam 62.

In order to increase the maximum power of the coherent multiple beam laser system while still synchronizing the phase of the individual slab laser outputs, the coherent multiple beam laser system 145, FIG. 11, may stack a plurality of slab laser modules $144_{1-n}$ in a first dimension. The terms "first dimension", "second dimension", and "third dimension", are for illustrative purposes only and are not intended to denote a specific direction. Primary reflective device 146 may be constructed of multiple convex sections 148, 150 and 152 and secondary reflective device 154 may be constructed of multiple concave sections 156 and 158. The number of sections of which primary and secondary reflective devices 146 and 154 are constructed varies in accordance to the number of slab laser modules $144_{1-n}$ stacked in the first dimension. During use, the plurality of laser beams 160 exit through at least one exit aperture 162 and 164 striking beam compacting device 40, producing composite output beam 42. Composite output beam 42 strikes feedback device 166, generating feedback portion 168 which is fed back into the coherent multiple beam laser system 145. Feedback portion 168 is fed back between adjacent slab laser modules $144_{1-n}$ by reflecting between primary reflective device 146 and secondary reflective device 154, producing coherent composite output beam 170.

A three-dimensional view of the coherent multiple beam laser system 145 with portions of feedback device 166 and unstable resonator 169 removed for illustrative purposes is shown in FIG. 12.

To further increase the power of the coherent multiple beam laser system 171, FIG. 13, a plurality of slab laser modules $172_{1-n}$ may be stacked in a second dimension.

Phase coherency between slab laser modules $172_{1-n}$ is achieved by incorporating retroreflectors 178 and 180 into primary and secondary reflective devices 174 and 176 so that feedback portion 182 can be fed back between adjacent slab laser modules $172_{1-n}$. Note that while FIG. 13 shows primary and secondary reflective devices 174 and 176 as continuous reflective devices (with portions broken away) spanning the distance 179 between adjacent slab laser modules $172_{1-n}$, discreet primary and secondary reflective devices can be utilized, as shown in FIG. 14.

A three-dimensional view of the coherent multiple beam laser system 171, FIG. 13, with portions of feedback device 184, feedback device 186 and unstable resonator 188 broken away for illustrative purposes is shown is shown in FIG. 14. Note that coherent composite output beams 190 and 192 may further be combined into a single coherent composite output beam through the use of an additional beam collecting device (not shown).

The coherent multiple beam laser system 195, FIG. 15, may include a plurality of unstable resonators $194_{1-n}$ stacked in a third dimension and the phase of the plurality of laser beams 196 can be synchronized if a feedback portion 198 is fed back between adjacent unstable resonators $194_{1-n}$. Feedback portion 198 may be fed back between adjacent unstable resonators $194_{1-n}$ through at least one passage 200, which passes through primary and secondary reflective devices 197 and 199 and connects adjacent unstable resonators $194_{1-n}$. Note that the external optics of the coherent multiple beam laser system 195 have been removed for illustrative purposes.

A three-dimensional view of the coherent multiple beam laser system 195 with portions of feedback device 202 and unstable resonators $194_{1-n}$ broken away for illustrative purposes is shown in FIG. 16.

The coherent multiple beam laser system 206, FIG. 17, may include a means for thermally controlling 208 (cooling and/or heating) the plurality of slab lasers $210_{1-n}$. Means for thermally controlling 208 may include a recirculation system 212 for circulating a cooling medium 214 throughout the plurality of slab lasers $210_{1-n}$. At least one slab 216 may include at least one cooling passage 218 for circulating cooling medium 214 throughout the plurality of slabs $210_{1-n}$ to remove heat from the plurality of slabs. Recirculation 212 may include a heat exchanger 220 for removing excess heat from cooling medium 214. Cooling medium 214 may be a liquid, such as: water; glycol; nitrogen, helium; hydrogen; air; oxygen; methane; carbon tetrafluoride; ethylene; ethane; nitrous oxide; carbon dioxide; propane; monochlorotrifluoromethane; ammonia; isobutane; sulphur dioxide; monochlorodifluoromethane; methylchloride; butane; dichlorodifluoromethane; ethyl ether; methylene chloride; dichlorotetrafluoroethane; freon; glycol-water mixtures; dichloromonofluoromethane; sodium-potassium eutectic solution; trichloromonofluoromethane; liquid metal; and trichlorotrifluoroethane. Cooling medium 214 may be a gas, such as: nitrogen; helium; hydrogen; air; oxygen; methane; carbon tetrafluoride; ethylene; ethane; nitrous oxide; carbon dioxide; propane; monochlorotrifluoromethane; ammonia; isobutane; sulphur dioxide; monochlorodifluoromethane; methylchloride; butane; dichlorodifluoromethane; ethyl ether; methylene chloride; dichlorotetrafluoroethane; freon; glycol-water mixtures; dichloromonofluoromethane; sodium-potassium eutectic solution; trichloromonofluoromethane; liquid metal; and trichlorotrifluoroethane.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A laser system comprising:
   a plurality of spaced slabs with a lasing medium located in the gap therebetween forming a plurality of slab laser structures;
   a reflective surface on each end of each slab laser structure and means for exciting the lasing medium in the gap between each pair of spaced slabs which, in combination, allow each slab laser structure to output a laser beam
   a feedback device, responsive to the output of each slab laser structure, positioned near at least one end of, but physically separated from, each slab laser structure to allow non-waveguide laser beam propagation, coupling the output of each slab laser waveguide structure to at least one other slab laser waveguide structure, thereby synchronizing the phase of the outputs of all the slab laser structures; and
   an output coupler responsive to the phase-synchronized outputs of all the slab laser structures for extracting a single, phase-coherent output laser beam from the plurality of slab laser structures.

2. The laser system of claim 1 in which the feedback device is integral with the reflective surfaces.

3. The laser system of claim 2 in which the feedback device includes V-shaped grooves formed in the reflective surfaces.

4. The laser system of claim 1 in which the feedback device is separate from the reflective surfaces.

5. The laser system of claim 1 in which the plurality of slabs are essentially parallel to each other.

6. The laser system of claim 1 in which each slab laser structure includes a waveguide segment consisting of two slab wall surfaces extending in a longitudinal direction between two ends of the waveguide and in a transverse width direction to two outer side edges of the waveguide, such transverse width and longitudinal dimensions being multiples of the gap between these slab wall surfaces of the waveguide.

7. The laser system of claim 6 in which the output coupler is one component of a resonant optical cavity surrounding the spaced slabs, said cavity having a single optical axis located in a plane defined by said longitudinal direction and said gap direction of said plurality of slab laser structures, and responsive to said plurality of slab laser structure outputs for extracting the single coherent laser output beam.

8. The laser system of claim 7 in which said resonant optical cavity is a resonator which includes a primary reflective surface positioned at a first end of said resonator and a secondary reflective surface positioned at a second end of said resonator.

9. The laser system of claim 8 in which said resonator is an unstable resonator.

10. The laser system of claim 8 in which said resonator is a stable resonator.

11. The laser system of claim 8 in which said reflective surfaces are mirrors.

12. The laser system of claim 11 in which said reflective surfaces are mirrors which further include reflective diffractive-optical surfaces.

13. The laser system of claim 6 in which said feedback device includes intra-cavity means continuously distributed along the optical axis and located at at least one end of each slab laser structure for redirecting a portion of at least one output from one slab laser structure to at least one other slab laser structure, and physically spaced from the ends of the slabs to augment the mode-selection characteristics of the slab laser structure with minimal optical losses for the resonant cavity's modes of interest, such spacing also permitting diffusive gas replenishment of the gain medium and extending the life of said feedback devices.

14. The laser system of claim 13 in which said means for redirecting includes a reflective device located at at least one end of each slab laser structure for generating a feedback and a feed-forward portion by reflecting a percentage of said output from each slab laser structure continuously across the entire beam area's width and gap directions within the resonator to the other slab laser structures.

15. The laser system of claim 13 in which said reflective device includes at least one convex subsection for reflecting said feedback portion continuously across the entire beam area's width and gap directions within the resonator to the other slab laser structures.

16. The laser system of claim 3 in which the angle of said V-shaped grooves is essentially 90 degrees.

17. The laser system of claim 13 in which said means for redirecting includes a refractive device generating a feedback and a feed-forward portion by refracting a percentage of said slab laser output from each slab laser structure continuously across the entire area's width and gap directions within the resonator to the other slab laser structures.

18. The laser system of claim 13 in which said means for redirecting includes a diffractive-optic device located at at least one end of the slab laser structure for generating a feedback and a feed-forward portion by redirecting a percentage of said slab laser structure output through each slab laser structure continuously across the entire beam area's width and gap directions to the other slab laser structures.

19. The laser system of claim 13 in which said means for redirecting includes a diffractive and refractive device located at at least one end of the slab laser structure for generating a feedback and a feed-forward portion by diffracting and refracting a percentage of said slab laser structure output continuously across the entire beam area's width and gap directions to the other slab laser structures.

20. A coherent multiple slab laser system comprising:

a plurality of spaced slabs forming a slab array;

a lasing medium between each adjacent pair of spaced slabs;

a reflective surface on each end of the array forming a laser resonator including a plurality of slab lasers each having an output when excited;

an AC generator connected between alternating slabs for exciting said plurality of slab lasers for generating the slab laser outputs;

a feedback device, responsive to an output to at least one slab laser, positioned to feedback a portion of said output to at least one of the other slab lasers for synchronizing the phase of the outputs of all the slab lasers; and an output coupler responsive to the outputs of all the slab lasers for providing a single coherent output laser beam consisting of the outputs of each slab laser.

21. A coherent multiple slab laser system comprising:

a plurality of spaced slabs forming a slab array;

a lasing medium between each adjacent pair of spaced slabs;

a reflective surface on each end of the array forming a laser resonator including a plurality of slab lasers each having an output when excited;

a reflective device, responsive to an output of at least one slab laser, positioned to feedback a portion of said output to the other slab lasers for synchronizing the phase of the outputs of all the slab lasers.

22. A coherent multiple slab laser system comprising:

a plurality of spaced slabs forming a slab array;

a lasing medium between each adjacent pair of spaced slabs;

a reflective surface on each end of the array forming a laser resonator including a plurality of slab lasers each having an output when excited;

a refractive device, responsive to an output of at least one slab laser, positioned to feedback a portion of said output to the other slab lasers for synchronizing the phase of the outputs of all the slab lasers.

23. A coherent multiple slab laser system comprising:

a plurality of spaced slabs;

a lasing medium between each adjacent pair of slabs;

a resonant optical cavity surrounding the plurality of slabs for producing a single laser output beam from the outputs of each slab laser; and a feedback device, responsive to an output of at least one said slab laser and positioned to feedback a portion of said output to the other slab lasers for synchronizing the phase of the outputs of all the slab lasers thereby providing a single laser output beam consisting of the outputs of each slab laser.

24. A method of operating a plurality of slab lasers, the method comprising:

feeding a portion of the output of one slab laser to other slab lasers for synchronizing the phase of the outputs of all the slab lasers; and forming a single coherent output beam consisting of the outputs of each slab laser.

25. The laser system of claim 1 further including a fiber optic cable positioned to receive the single coherent output laser beam.

26. The laser system of claim 25 in which the fiber optic cable is a hollow-core or solid-core fiber optic cable.

27. A coherent multiple slab laser system comprising:

a plurality of spaced slabs forming a slab array;

a lasing medium between each adjacent pair of spaced slabs;

a reflective surface positioned on each end of the array of spaced slabs to form a laser resonator including a plurality of slab lasers each having an output;

a feedback device responsive to the output of at least one slab laser for synchronizing the phase of the outputs of all the slab lasers; and an output coupler responsive to the outputs of all the slab lasers for providing a single coherent output laser beam consisting of the outputs.

28. The system of claim 27 in which the slabs are stacked to form a one dimensional array of slabs.

29. The system of claim 27 in which the slabs are stacked to form a two dimensional array of slabs.

30. The system of claim 27 in which the slabs are stacked to form a three dimensional array of slabs.

31. The system of claim 28 in which the slabs are stacked vertically one on top of the other.

32. The system of claim 28 in which the slabs are stacked horizontally.

33. The system of claim 29 in which the slabs are stacked vertically in at least two stacks.

34. The system of claim 29 in which the slabs are stacked horizontally in at least two stacks.

35. The system of claim 30 in which the slabs are stacked vertically in at least three stacks.

36. The system of claim 30 in which the slabs are stacked horizontally in at least three stacks.

* * * * *